UNITED STATES PATENT OFFICE.

RALPH B. NAYLOR, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

ACCELERATOR.

1,418,824.  Specification of Letters Patent.  Patented June 6, 1922.

No Drawing.  Application filed August 26, 1920. Serial No. 406,196.

*To all whom it may concern:*

Be it known that I, RALPH B. NAYLOR, a citizen of the United States of America, residing at Springfield, in the county of Hampden and State of Massachusetts, have invented certain new and useful Improvements in an Accelerator, of which the following is a specification.

My invention relates to a new organic accelerator for use in the vulcanization of rubber, to a process by which this accelerator may be produced, and to rubber vulcanized by the use of this accelerator.

According to my invention, the rubber is combined prior to vulcanization with sulphur, any suitable filler if desired, and a small amount of my accelerator. The accelerator greatly decreases the time necessary for vulcanization, produces beneficial results as to tensile strength in the vulcanized rubber, and avoids the harmful effects inherent in the use of former accelerators.

My new accelerator consists of the condensation product of para-toluidine and formaldehyde. I believe the reaction to be as follows:

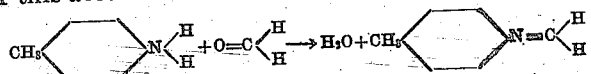

The condensation product is probably a polymer or mixture of polymers having the formula $(CH_3C_6H_4N=CH_2)_x$ and the structure

The resulting condensation product of para-toluidine and formaldehyde, whatever may be its exact structure, has valuable properties as an accelerator. For example it is non-poisonous and non-scorching, produces no discoloration of the rubber, imparts no offensive odor to the rubber, is very stable, and possesses marked accelerating properties.

I am aware that it has formerly been proposed to use certain substances such as aniline, formaldehyde-aniline, or nitroso-dimethyl-aniline as accelerators of vulcanization, but none of these compounds possess the desirable combination of properties found in my new compound. For example, aniline is poisonous, fumes badly, and possesses comparatively weak accelerating properties. Formaldehyde-aniline, another of the substances proposed, fumes very badly, causing intense discomfort to the workman, and gives to the rubber after vulcanization an offensive odor. Nitroso-dimethyl-aniline is highly unstable, even explosive, scorches and discolors the rubber, is poisonous, and causes irritating skin trouble.

The condensation product comprising my improved accelerator is preferably manufactured as follows: Solid para-toluidine is added to a water at a temperature of approximately 70° C., and agitated until a solution, or, more strictly, an emulsion, is formed. Preferably this emulsion is made dilute, the proportion of para-toluidine being about one per cent or less, for the reason to be described. The emulsion is then run into churns or agitators, and a dilute solution of formaldehyde added slowly. A white precipitate of the condensation product forms. After all the formaldehyde necessary for the reaction has been added the liquid and precipitate are agitated for about ten minutes and are then run onto a filter. On drying the precipitate in a centrifuge and a hot air drier it is ready for use. The temperature of the air drier should preferably be under 90° C.

By using dilute solutions as described and by adding the formaldehyde slowly the precipitate need not be ground after drying, as it is formed in exceedingly fine particles. While I prefer to use this procedure a product equally fit for the vulcanizing operation, except that it must be ground, may be obtained from concentrated solutions.

The improved accelerating compound may be incorporated in various rubber mixes, as will be well understood by those skilled in this art, but for the purposes of showing one form in which my invention may be practised the following specific formula is given, the mix being suitable for use as a tread stock for automobile tires.

| | |
|---|---|
| Plantation rubber | 200 parts by weight. |
| Sulphur | 20 " " " |
| Zinc oxide | 178 " " " |
| Accelerator | 2 " " " |
| | 400 " " " |

If this mixture be cured for thirty minutes under 50 pounds steam pressure a product having a tensile strength of about 3000 pounds per square inch will result. Omitting the accelerator the time of cure needs to be lengthened to one hour and forty-five minutes. Other fillers may be substituted for the zinc oxide, although some zinc oxide is preferably used, and the proportions of ingredients varied to conform to the requirements of the product desired, as will be understood by those skilled in the art, the proportion of accelerator to rubber preferably being about one or two per cent as in the illustration given.

I claim:

1. An accelerator for use in rubber vulcanization comprising a condensation product of para-toluidine and formaldehyde.

2. An accelerator for use in rubber vulcanization having the composition $CH_3C_6H_4N=CH_2$ or a polymer or mixture of polymers thereof.

3. The process of accelerating the vulcanization of rubber comprising incorporating in the uncured rubber mix a condensation product of para-toluidine and formaldehyde, and vulcanizing the mixture.

4. The process of preparing vulcanized rubber comprising mixing together uncured rubber, sulphur, and an accelerator having the composition $CH_3C_6H_4N=CH_2$ or a polymer or mixture of polymers thereof, and vulcanizing the mixture.

5. The process of preparing vulcanized rubber comprising mixing together uncured rubber, sulphur, zinc oxide, and a condensation product of para-toluidine and formaldehyde, and vulcanizing the mixture.

6. The process of preparing vulcanized rubber comprising mixing together approximately two hundred parts of uncured rubber, twenty parts of sulphur, one hundred seventy-eight parts of zinc oxide, and two parts of a condensation product of para-toluidine and formaldehyde, and vulcanizing the mixture.

7. The process of preparing rubber for vulcanization comprising mixing the rubber with sulphur and a condensation product of para-toluidine and formaldehyde.

8. Vulcanized rubber containing the reaction product of unvulcanized rubber, sulphur, and a condensation product of para-toluidine and formaldehyde.

9. The process of preparing a substance suitable for use as an accelerator comprising adding a dilute solution of formaldehyde to a dilute emulsion of para-toluidine in water, and filtering the resulting precipitate.

RALPH B. NAYLOR.